United States Patent [19]

Kirchen et al.

[11] 4,416,673

[45] Nov. 22, 1983

[54] DUST COLLECTOR FOR FURNACE CHARGING INSTALLATION

[75] Inventors: Michel Kirchen; Marc Solvi, both of Luxembourg; Clément Burton, Esch s/Alzette, all of Luxembourg

[73] Assignee: Paul Wurth S.A., Luxembourg

[21] Appl. No.: 350,253

[22] Filed: Feb. 19, 1982

[30] Foreign Application Priority Data

Feb. 23, 1981 [LU] Luxembourg .......................... 83.161

[51] Int. Cl.[3] .............................................. B01D 45/00

[52] U.S. Cl. ........................................ 55/267; 55/446; 55/481; 266/157; 266/182

[58] Field of Search .................................. 55/267–269, 55/323, 310, 429, 444–446, 481; 266/157, 182

[56] References Cited

U.S. PATENT DOCUMENTS

| | | | |
|---|---|---|---|
| 1,228,237 | 5/1917 | Oleson | 55/446 |
| 1,527,235 | 2/1925 | Taylor | 55/446 |
| 1,632,325 | 6/1927 | Anderson | 55/446 |
| 1,752,260 | 3/1930 | Calder et al. | 55/444 |
| 2,088,994 | 8/1937 | Covey | 55/446 |
| 3,693,812 | 9/1972 | Mahr et al. . | |
| 3,854,908 | 12/1974 | Hausberg et al. . | |
| 3,892,550 | 7/1975 | Riis | 55/446 |

FOREIGN PATENT DOCUMENTS

| | | | |
|---|---|---|---|
| 312997 | 6/1919 | Fed. Rep. of Germany | 55/444 |
| 631911 | 11/1949 | United Kingdom | 55/446 |

*Primary Examiner*—Bernard Nozick
*Attorney, Agent, or Firm*—David S. Fishman

[57] ABSTRACT

Entrained particulate matter is separated from the pressurized gas released from an intermediate charge material storage hopper of a blast furnace charging installation, the hopper alternately being pressurized to the furnace pressure for release of charge materials into the furnace and the pressure being relieved to atmospheric to permit reloading, at a point upstream of the filters and/or silencers through which the pressurized gas is released to the ambient atmosphere. The separator comprises a series of perforated discs, which may be heated, associated with a collection chamber into which separated material will fall under the influence of gravity.

5 Claims, 9 Drawing Figures

DUST COLLECTOR FOR FURNACE CHARGING INSTALLATION

BACKGROUND OF THE INVENTION (1) Field of the Invention

The present invention relates to the handling of dirt-laden gases and particularly to the separation of particulate matter from such gases prior to their release to the ambient atmosphere through a silencer and/or filter. More specifically, this invention is directed to a dust separator and especially to a separator for installation in a pressure equalization conduit or a shaft furnace charging installation. Accordingly, the general objects of the present invention are to provide novel and improved methods and apparatus of such character.

(2) Description of the Prior Art

While not limited thereto in its utility, the present invention is particularly well suited for use in the environment of a blast furnace. Modern blast furnaces operate with a relatively high counter-pressure. The material with which the furnace is charged must be delivered thereto, during furnace operation, from the ambient atmosphere. This is accomplished by providing charging bells or storage hoppers which may be alternately opened to the atmosphere for loading with charge material and subsequently sealed from the atmosphere and pressurized to the level of the pressure existing within the furnace whereupon a discharge valve may be opened and the charge material released into the furnace. A furnace charging installation employing a pair of intermediate storage hoppers which are alternately pressurized and depressurized may be seen from U.S. Pat. No. 3,693,812. In the referenced patent the pressure within the intermediate storage hoppers, which are indicated at 2 and 2′, is reduced to atmospheric by means of pressure equalization valves indicated generally at 8 and 8′.

Environmental configurations require that, when the pressure within a storage hopper of a shaft furnace charging installation is to be reduced to atmospheric, noise and release of particulate matter to the atmosphere be held to an acceptable level. These requirements, in turn, dictate that the conduits through which the gas travels in escaping from the hopper be positioned high above the work area and be equipped, at or adjacent their discharge ends, with silencers and/or filters. The comparatively inexcessible location, and the dangerous environment, renders the service of these silencers and/or filters difficult.

The atmosphere within a furnace charge storage hopper, for example one of the hoppers 2 of U.S. Pat. No. 3,693,812 is very dirty and may, at the time pressure equalization is required, be as high as 3 bars or more. Thus, when the pressure equalization valve is opened, to reduce the chamber pressure to atmospheric, there will be expansion and, accordingly, considerable cooling of the dust-laden gases which escape through the pressure equalization system conduit. This cooling results in the condensation of water on the elements of the silencers and/or filters exposed to the gas stream. The condensed water may freeze thus blocking the silencers and/or filters thus preventing or slowing the pressure equalization cycle. If the condensate does not freeze, dust entrained in the escaping gases will be wetted thereby thus forming an encrustation of dirt which interfers with proper operation of the silencers and/or filters. In either case, the silencers and/or filters must be periodically cleaned or removed and replaced and this is a difficult and time consuming task.

SUMMARY OF THE INVENTION

The present invention overcomes the above-discussed and other deficiencies and disadvantages of the prior art by providing for the separation of particulate matter from a stream of dirt-laden gas upstream of the point where the gas is released, through a silencer and/or filter, to the atmosphere. Apparatus in accordance with the present invention comprises a dust separator which may be installed in the pressure equlization conduit of a furnace charging installation.

Apparatus in accordance with a preferred embodiment of the invention comprises a plurality of perforated plates, arranged serially in the direction of gas flow, which are oriented at an angle in the range of 30°–40° with respect to horizontal. The apertures in the individual plates of the plurality are preferrably offset such that a solid surface is in alignment with the discharge end of each aperature of all but the last plate in the downstream direction. A dust collector chamber is positioned generally vertically below the plates whereby particulate matter, separated from the gas by the plates, will fall into the collector chamber under the influence of gravity. The perforated plates are heated in the interest of preventing the formation of condensation thereon.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
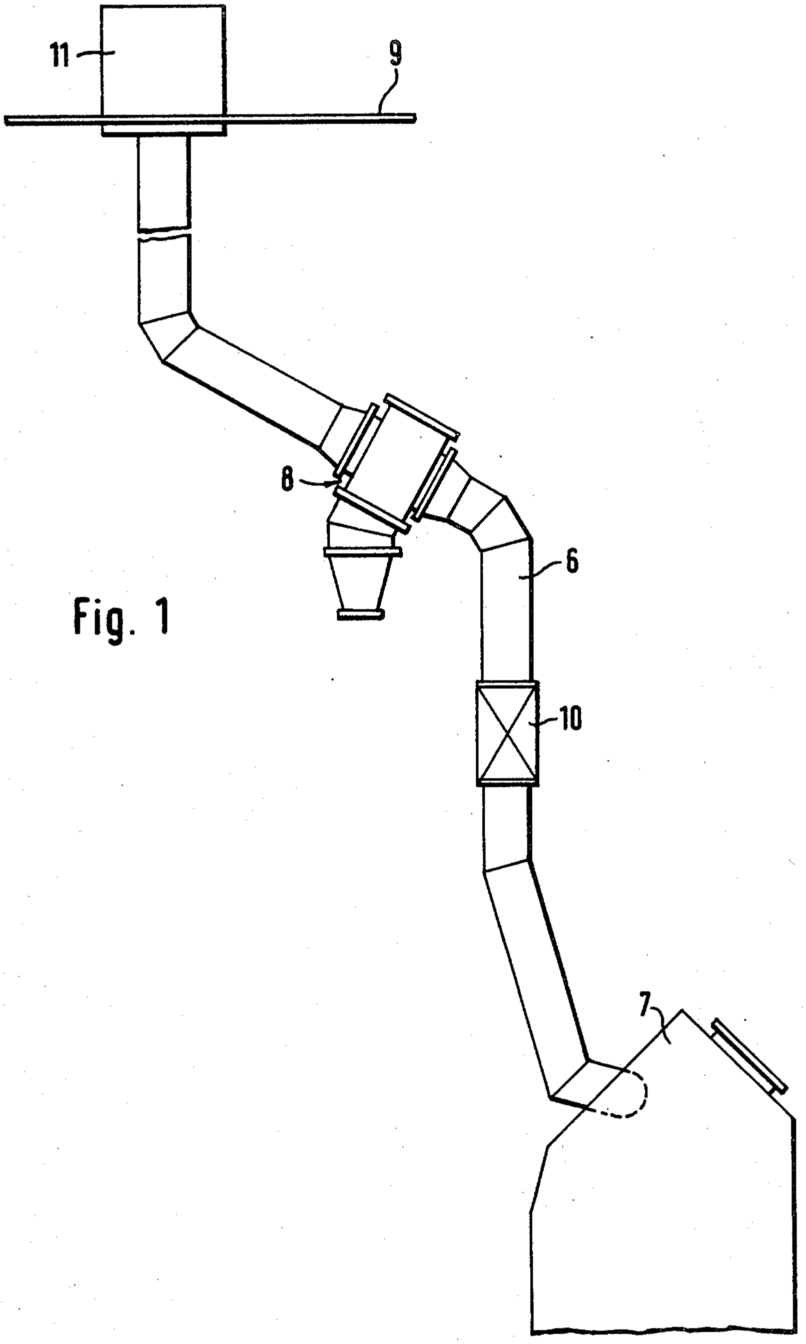
FIG. 1 is a schematic view of a pressure equalization system for a furnace charging installation in accordance with the present invention.
Figure 2A:
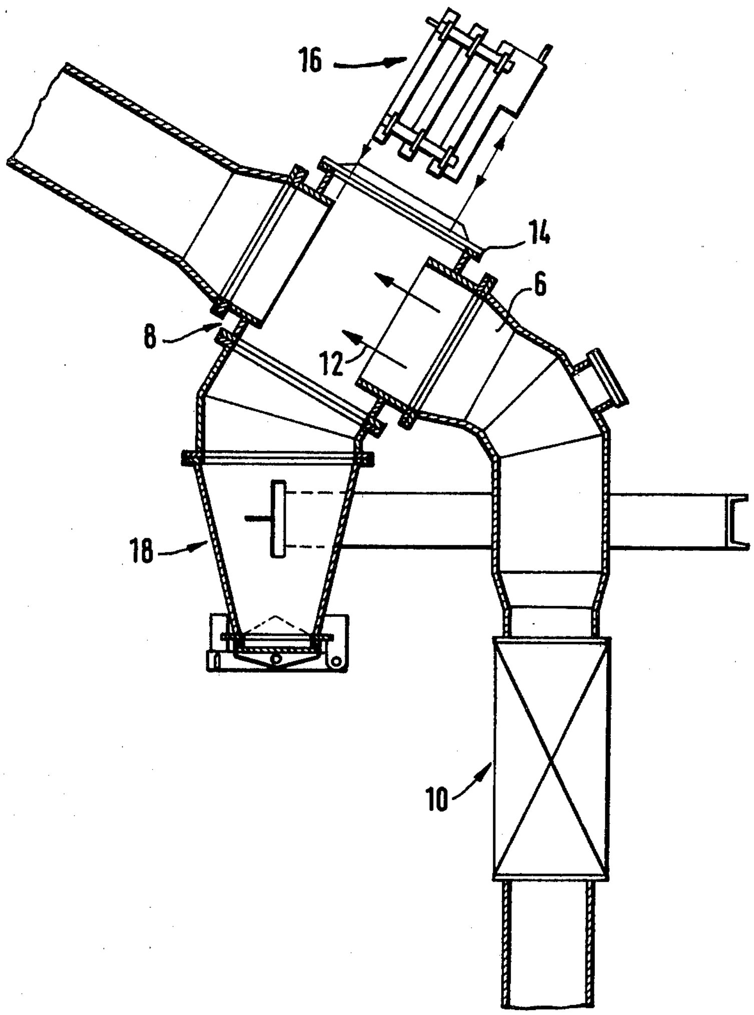
FIGS. 2*a* and 2*b* are schematic cross-sectional side elevation views of separator apparatus in accordance with a preferred embodiment of the present invention and intended for use in the system of FIG. 1.
Figure 2B:
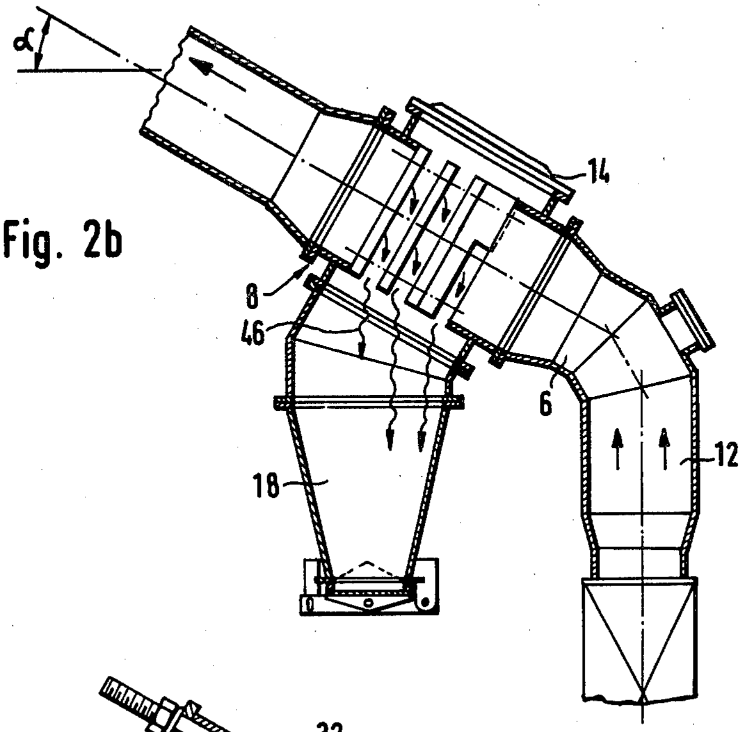
Figure 4:
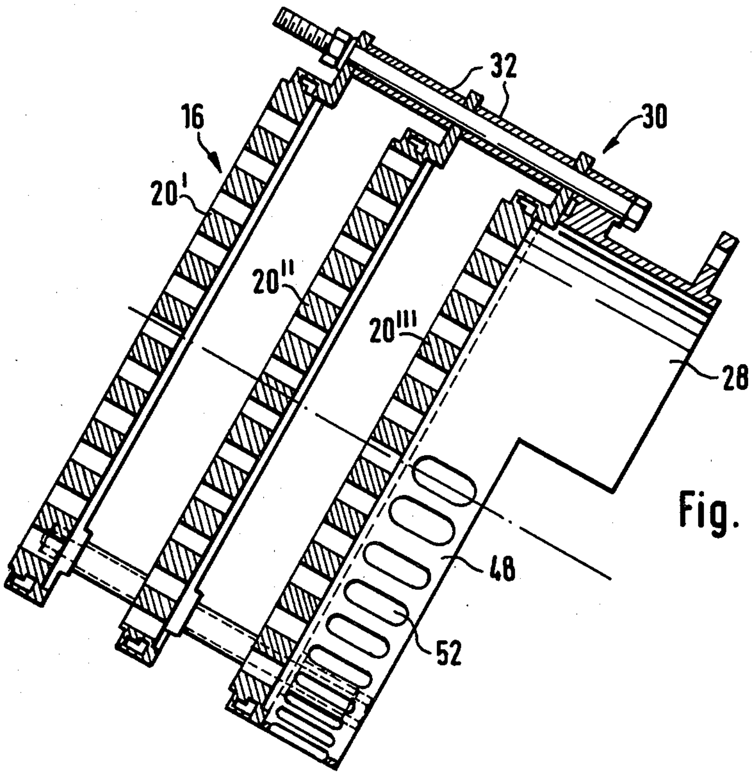
FIG. 4 is a cross-sectional view of a portion of the apparatus of FIG. 3.

With reference to FIG. 1, a bin or hopper in which particulate matter may be stored for subsequent release into a pressurized chamber, for example a blast furnace, is indicated at 7. In order to permit the loading and unloading thereof, the hopper 7 will be alternately pressurized to the level existing within the chamber to which the contains of the hopper are to be delivered and returned to atmospheric pressure. The depressurization of hopper 7 is accomplished by releasing the pressurized gas therefrom to the atmosphere via a pressure equalization conduit 6 which terminates, at its discharge end, in a silencer 11. The silencer 11 will typically be supported, in order to enable the servicing thereof, on a so-called bleeder platform 9. The flow of gas through conduit 6 is controlled by means of a pressure equalization valve 10 which is installed therein. In order to minimize the possibility of the contamination thereof by particulate matter entrained in the gas which passes through conduit 6, the equalization valve 10 is located in a section of the conduit which is steeply ascending or, in fact, vertical. A separator in accordance with the present invention is indicated at 8 and is located in conduit 6 at a point downstream of valve 10. For reasons which will be explained below, separator 8 is positioned in a section of conduit 6 which is oriented at a comparatively shallow angle with respect to horizontal.

The details of a preferred embodiment of the separator 8, which may be considered to be a preliminary cleaning device, may be seen from a joint consideration of FIGS. 2–7. Thus, the separator 8 comprises a plurality of individual cleaning elements 20 which, in the direction of gas flow through conduit 6, the gas flow being indicated by arrows 12, are serially arranged. In the disclosed embodiment the individual cleaning elements 20 are interconnected, in the manner to be described below, to form a set or unit, indicated generally at 16. The cleaning unit 16 may be removed from conduit 6 via an opening which is normally sealed by a cover 14. The set of cleaning elements is positioned above a collecting vessel, indicated generally at 18, whereby particulate matter separated from the gas stream will, under the influence of gravity, travel downwardly and be collected in vessel 18.

In order to insure that the particulate matter separated from the gas stream by the individual cleaning elements 20 will fall into vessel 18, rather than traveling back down conduit 16 toward hopper 7, the separator device 8 is positioned in a section of conduit 6 which, as noted above, is oriented at a comparatively shallow angle with respect to horizontal when compared to the remaining, i.e., upstream and downstream, portions of conduit 6. In accordance with a preferred embodiment, the oblique section of conduit 6 in which the separator device 8 is housed is inclined at an angle in the range of 30° to 40° with respect to horizontal.

Figure 3:
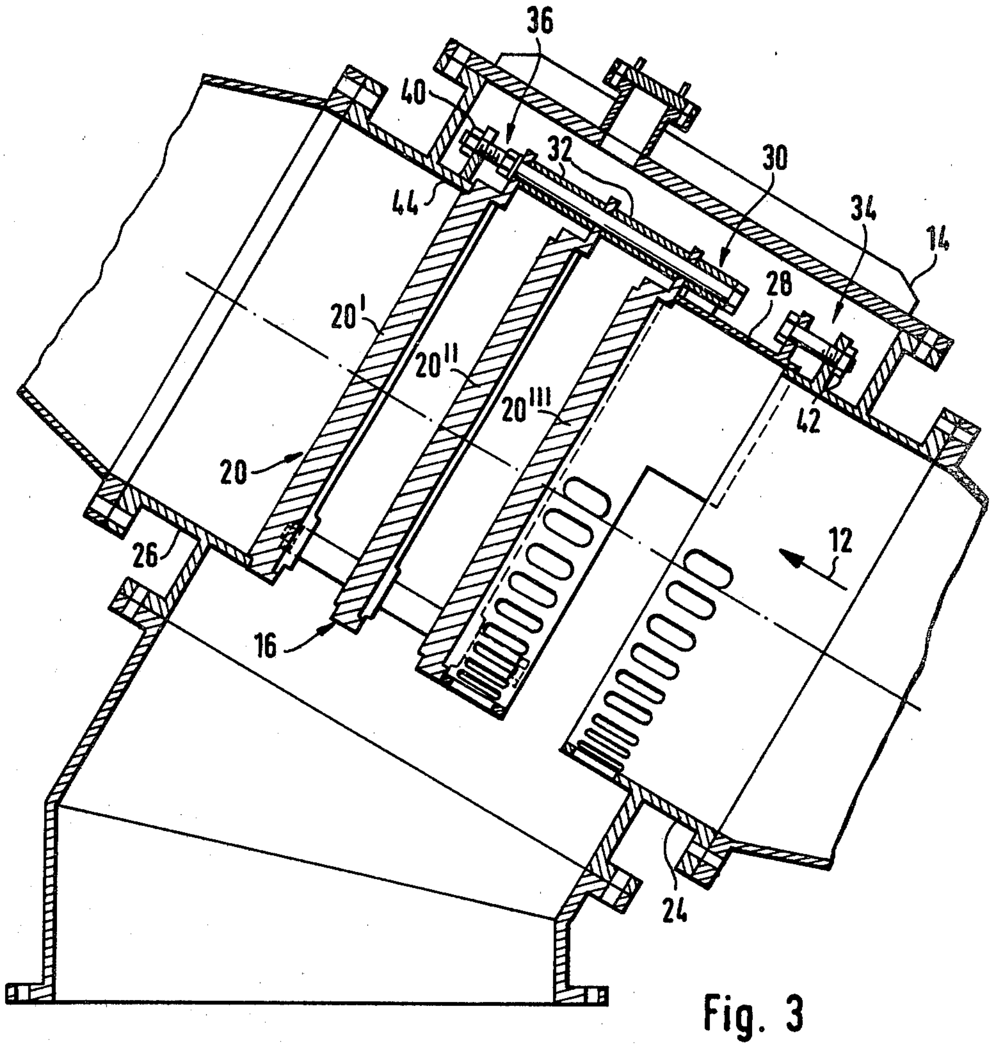
FIG. 3 is a cross-sectional schematic view, on an enlarged scale, of the separator of FIGS. 2*a* and 2*b*.
Figure 5B:
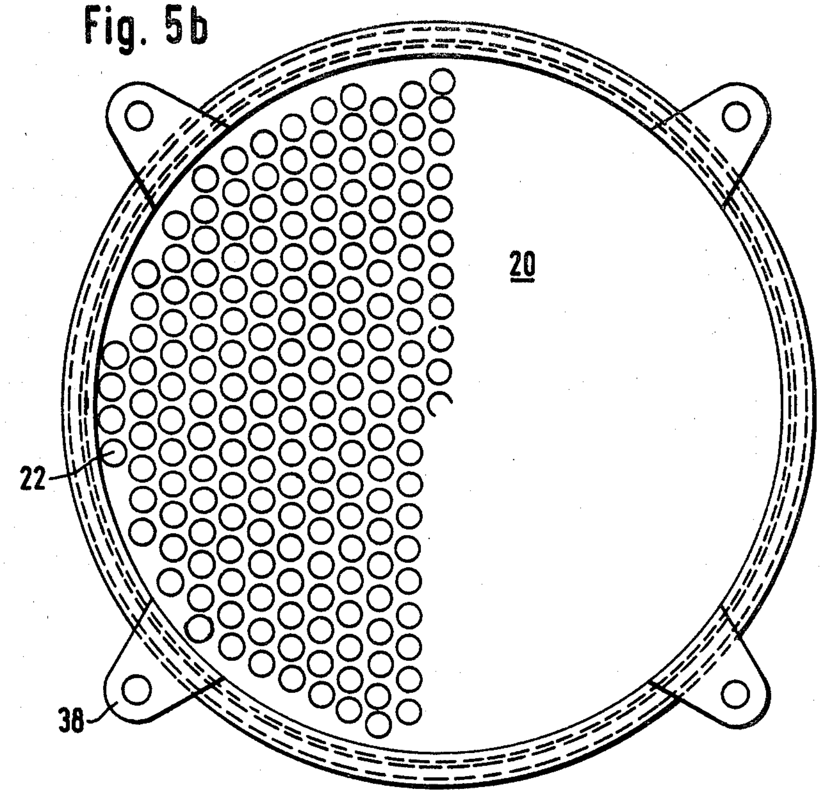
FIG. 5*b* is a plan view of the separator plate of FIG. 5*a*.
Figure 5A:
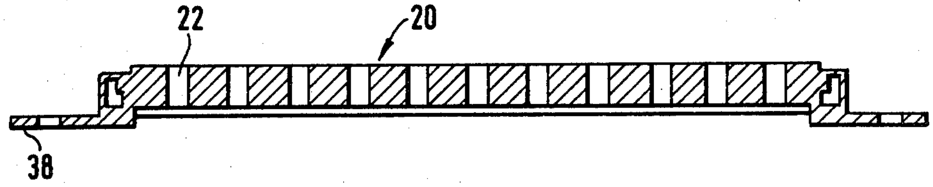
FIG. 5*a* is a cross-sectional side elevation view of a separator plate for use in the apparatus of FIGS. 2–4.
Figure 6:
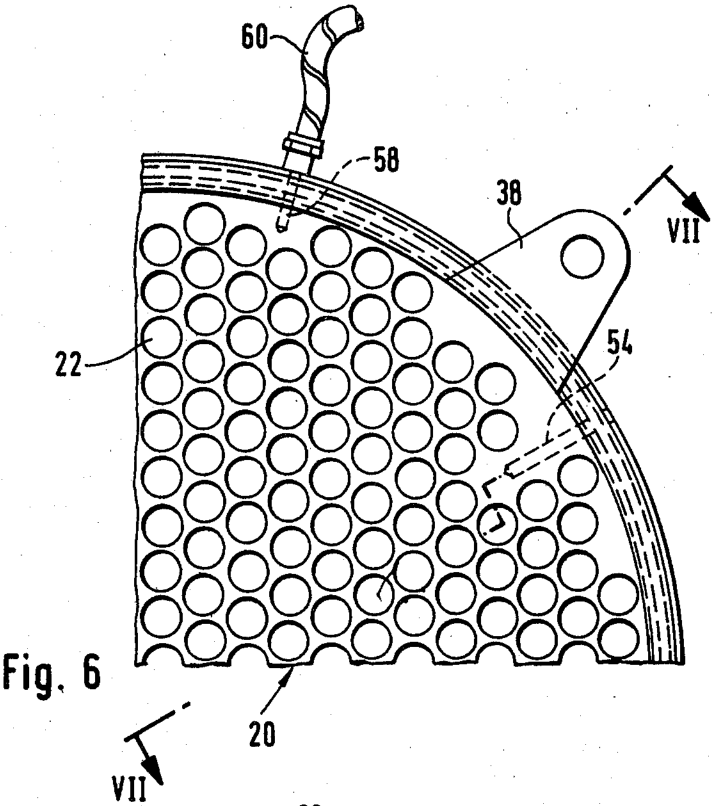
FIG. 6 is a partial view of a heated separator plate for use in the present invention.
Figure 7:
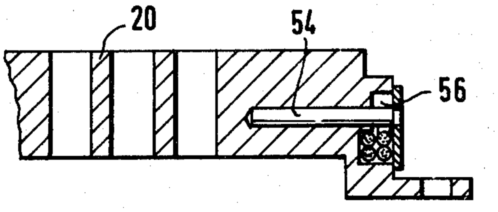
FIG. 7 is a partial cross-sectional view of the plate of FIG. 6.

With reference now to FIG. 3, the disclosed embodiment of the present invention employs three serially arranged cleaning elements 20 which have been indicated at 20′, 20″ and 20‴. These cleaning elements are generally in the form of perforated discs which are provided with apertures or through-holes 22 oriented parallelly with respect to the axis of the discs. The apertures 22, as may clearly be seen from FIGS. **5*a* and 5*b*, are distributed over the entire surface of each disc. The cleaning elements are supported, in a spacially displaced relationship, between a pair of flanged conduit sections 24 and 26. The conduit sections 24 and 26 function as connectors between respect of upstream and downstream sections of the conduit 6 and the separator or preliminary cleaning apparatus 8. The perforated discs 20 are mounted, in the manner which will be described below, from a generally saddle-shaped member 28 which is coaxial with the conduit sections 24 and 26. The inner diameter of the saddle 28 corresponds to the outer diameter of conduit section 24 whereby saddle 28 is slidable, in the axial direction, a limited distance on conduit section 24. The discs 20 are provided with mounting lugs 38 which may be seen from FIGS. 5*a* and 5*b*. The perforated discs are affixed to saddle 28 by means of mechanical connectors, indicated generally at 30, which include bolts which extend through the apertures in lugs 38. The saddle 28 will, of course, be open at the lower side thereof between a pair of the lugs 38 to permit solid material to fall into vessel 18. The connectors 30, in addition to bolts and associated nuts, include tubular spacers 32 which determine the spacing between the serially arranged perforated plates 20. The saddle 28 is connected to conduit segment 24 by means of a plurality of mechanical connectors 34 which also include bolts and associated nuts 42. The connectors 34 will all be positioned on that side of the conduit section and saddle which are accessible upon removal of cover 14. At the downstream end of the separator, by means of mechanical connectors which have been indicated generally at 36, a pair of bolts comprising the connectors 30 will be affixed to flange sections 44 of the conduit section 26 by means of nuts 40. Also at the downstream end of the separator, a mechanical connection is established between the perforated plate 20′, and particularly a peripheral shoulder thereon, and the conduit section 26**.

In order to disassemble the separator 8 the cover 14 will first be removed. Next, the nuts 40 will be released and the nuts 42 tightened to move the assembly comprising saddle 28 and discs 20 in the upstream direction. This upstream movement will disengage the shoulder on the downstream disc 20′ from the edge of conduit section 26. After this movement has been accomplished, the connectors 34 will be released and the entire subassembly comprising the saddle and perforated discs may be removed through the opening in the side of the conduit, provided when cover 14 is removed, as a unit. The connectors 34 and 36 will, of course, be provided only in the peripheral region of the conduit sections 24 and 26 which are exposed upon removal of cover 14 while the connectors 30 will be equally spaced about the periphery of the discs 20. The above-described arrangement permits the elements of separator 8 which are directly in the gas stream to be easily removed from the conduit 6 and subsequently easily dismantled for repair, replacement or cleaning of the individual perforated discs 20.

In order to enhance the rigidity of the separator unit 16, the most upstream disc 20″ may effectively be extended in the upstream direction and attached to the saddle member 28. This may, for example, be accomplished by providing perforated disc 20″ with a tubular stub 48 which is affixed, by any suitable means, to the saddle 28. The tubular stub 48 is provided with holes 52 in order to permit particulate matter separated from the gas stream upon impingement thereof against the face of perforated disc 20″ to fall into vessel 18. The conduit connector 24 is similarly provided with holes 54 in its lower side.

The desired preliminary cleaning of the gases passing through conduit 6, which reduces the demands made on the silencer 11 and any filters associated therewith, results from the fact that dust particles entrained in the gas passing through conduit 6 will impact on the walls of the perforated discs 20 between the apertures therein. As a result of the loss in kinetic energy resulting from such impact, the particulate matter will fall, under the influence of gravity, into the vessel 18. In order to enhance the efficiency of the separator 8, the apertures in the discs will be offset in relation to one another so as to provide a wall in alignment with the exit (downstream facing) side of each aperture. This offsetting of the apertures in the perforated discs also, by causing the gas flowing in the conduit to undergo changes in direction, increases turbulance which further assists in the separation of the particulate matter from the gas.

It is to be noted that, as a result of the expansion of the gases through the perforated discs 20, there may be some condensation of water which will act as a washing medium to keep the discs clean.

The efficiency of operation of separator 8 is enhanced by taking steps to insure that the particulate matter separated from the gas stream does not adhere to the perforated discs. This is achieved by separating the particles in a dry state. In order to accomplish the foregoing, the individual perforated discs 20 are heated. Thus, as may be seen from FIGS. 6 and 7, a number of heaters 54, 56 are arranged radially about the periphery of each of the perforated discs 20 in regions where there are no apertures in the disc. Through the use of thermocouples or other suitable temperature sensors, as indicated schematically at 58, the temperature of the discs is maintained above a predetermined level. The current for operating the heaters 55 is supplied by and the control signals provided by the temperature sensors 58 are routed to a control, not shown, by a cable 60.

While a preferred embodiment has been shown and described, various modifications and substitutions may be made thereto without departing from the spirit and scope of the invention. Thus, by way of example, the silencer 11 and/or filters may be combined with the preliminary cleaning apparatus 8. Accordingly, it is to be understood that the present invention has been described by way of illustrations and not limitation.

What is claimed is:

1. Apparatus for separating particulate matter from a stream of pressurized dust-laden gas, the gas to be passed through the separating apparatus being discharged from an intermediate storage hopper of a furnace charging installation, the hopper being provided with a steeply rising gas discharge conduit which has a pressure equalization valve associated therewith, comprising:

a plurality of perforated discs;

means supporting said perforated discs in a parallel spaced apart relationships in the gas stream, said supporting means orienating said discs at an oblique angle with respect to the horizontal;

means positioned below said discs for collecting particulate matter separated from the gas stream; and an extension of said hopper discharge conduit, said conduit extension being oriented at an angle with respect to said discharge conduit, said supporting means being positioned in said conduit extension;

said support means comprising:

a generally saddle-shaped suspension member;

means for removably attaching a first end of said suspension member to said conduit extension;

means for mounting said perforated discs from said saddle-shaped member, said mounting means including removable fasteners which engage said saddle-shaped member and said discs, said mounting means further comprising spacers for maintaining the desired axial displacement between said discs; and means for removably attaching the one of said discs displaced the farthest from said saddle-shaped member to said conduit extension whereby said attaching means and saddle-shaped member define a coaxial portion of said conduit extension.

2. The apparatus of claim 1 further comprising:

means for heating each of said discs.

3. The apparatus of claim 1 wherein the perforations in said discs have axes which are generally parallel with the disc axis and wherein said perforations in adjacent discs are non-aligned whereby the gas passing through said separating apparatus will undergo changes in direction as it passes serially through the discs.

4. The apparatus of claim 1 wherein said collecting vessel, attaching means and mounting means form a sealed enclosure which communicates with said conduit extension and wherein said mounting means is provided with a removable cover whereby said discs, saddle member and attaching means may be removed from the conduit extension as a unit.

5. The apparatus of claim 4 further comprising:

means for heating each of said discs.

* * * * *

UNITED STATES PATENT AND TRADEMARK OFFICE
CERTIFICATE OF CORRECTION

PATENT NO. : 4,416,673

DATED : Nov. 22, 1983

INVENTOR(S) : Michel Kirchen et al

It is certified that error appears in the above-identified patent and that said Letters Patent are hereby corrected as shown below:

Column 1, line 39, "configurations" should be --considerations--

Signed and Sealed this

*Sixteenth* Day of *April 1985*

[SEAL]

*Attest:*

DONALD J. QUIGG

*Attesting Officer* *Acting Commissioner of Patents and Trademarks*